Nov. 22, 1927.    L. T. NIXON    1,649,848
WINDSHIELD WIPER
Filed March 4, 1927
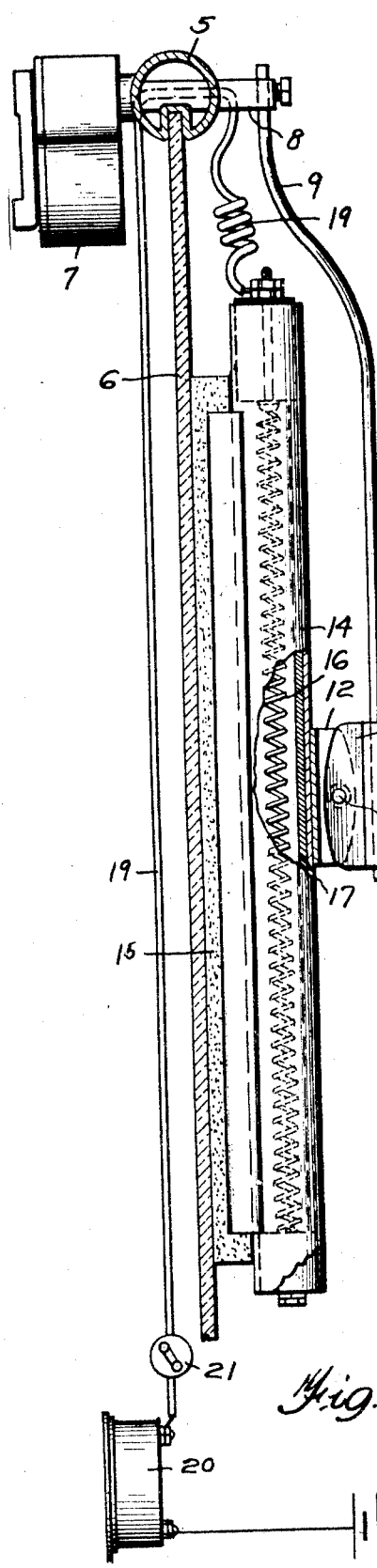
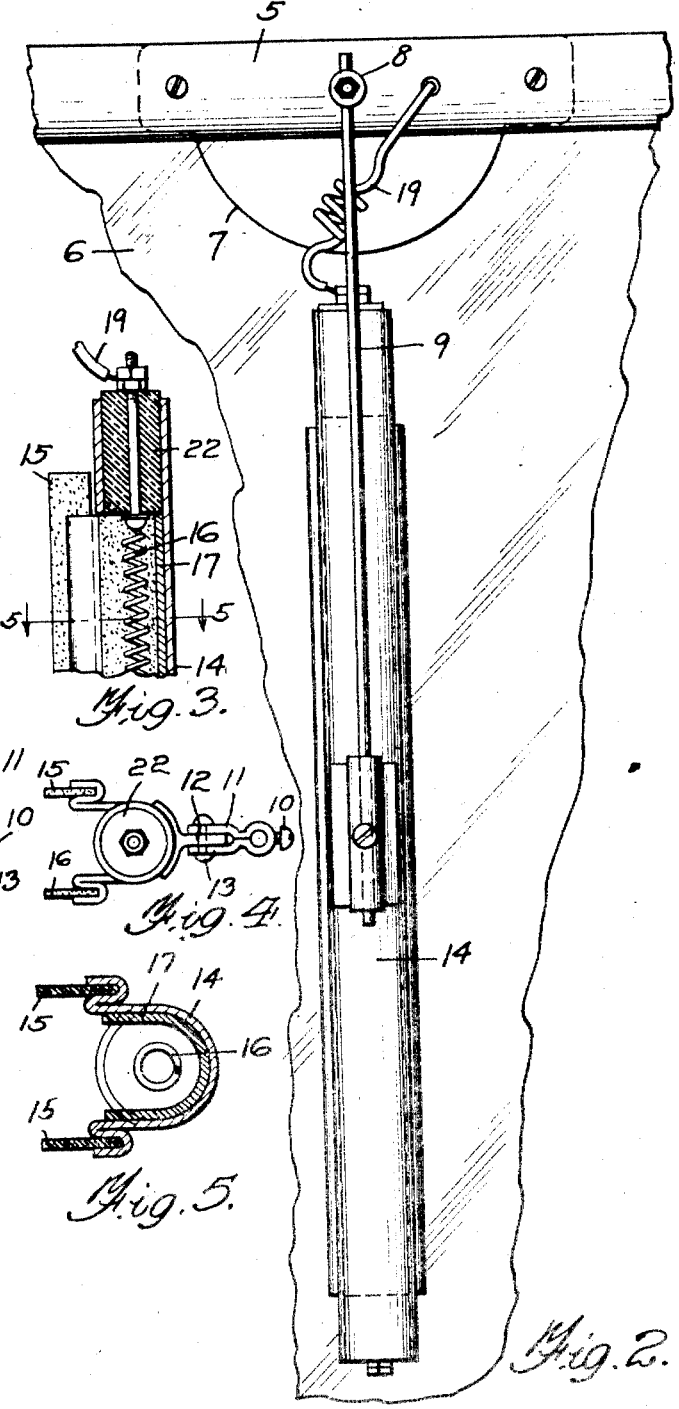
Inventor
L. T. NIXON,
By Samuel Herrick,
Attorney Patented Nov. 22, 1927.

1,649,848

UNITED STATES PATENT OFFICE.

LEVI T. NIXON, OF JET, OKLAHOMA.

WINDSHIELD WIPER.

Application filed March 4, 1927. Serial No. 172,678.

This invention relates to windshield wipers and it has for its object to provide a device of this character provided with means for heating the same.

It is a well known fact that many serious accidents have been caused by the obscuring of the vision of the drivers of automobiles by the presence of ice or snow on the windshield. Automatically operated windshield wipers of various kinds are on the market. Some of these are operated by the vacuum from the intake manifold; others are electrically operated. It is the primary purpose the present invention to provide any suitable type of windshield wiper, whether manually or automatically operated, with electrical heating means incorporated therein, for the purpose of so raising the temperature of the glass of the windshield that ice and snow will not accumulate thereon.

Further objects and advantages of the invention will be set forth in the detailed description which follows.

In the accompanying drawings:

Fig. 1 is a side elevation of a windshield wiper constructed in accordance with the invention, with certain of the parts in section.

Fig. 2 is a rear elevation thereof.

Fig. 3 is a vertical sectional view through the upper end of the wiper.

Fig. 4 is a plan view thereof, and

Fig. 5 is a horizontal sectional view upon line 5—5 of Fig. 3, but upon an enlarged scale.

Like numerals designate corresponding parts throughout the several figures of the drawing.

In the drawing, 5 designates the frame and 6 the glass of a conventional type of windshield. A conventional operating mechanism 7 which serves to impart oscillation to a shaft 8 and arm 9, is mounted in the usual way at the top of the windshield. A screw 10 secures a clip 11 in any adjusted position upon the arm 9. A T-shaped bracket has its shank 12 pivoted at 13 within the clip 11 and has its head welded solid or otherwise secured to a U-shaped casing 14 which constitutes the body of the wiper proper. The edges of this casing 14 are suitably formed to receive rubber wiping strips 14 which are adapted to bear against the outer surface of the glass 6 and to wipe the same in the usual way. A lining 17 of asbestos or other suitable insulating material is disposed within the shell 14 and serves to prevent loss of heat. An electric heating element, such as a coiled wire 16, extends the full length of the casing 14. It is grounded at its lower end to the casing 14, and at its upper end is connected to a conductor 19, which leads through the frame 5, and along any suitable path where it will not obstruct the vision through the windshield, to the electrical supply of the vehicle. I prefer to connect it into the electric circuit at the ammeter as indicated at 20. A switch 21, included in the length of this conductor, provides means for cutting off the current to the heating element 16, when desired. The upper end of the element 16 is suitably insulated from the casing 14 by means of a rubber or other insulating plug 22.

It is manifest that with the switch 21 closed, current will be delivered to the heating element 16. The heat delivered from said element being confined between the strips 15, will so raise the temperature of the glass as to prevent the formation of ice or snow thereon. It is a fact, particularly with closed cars, that the temperature of the glass is ordinarily very nearly high enough to prevent the formation of ice or snow. It needs only a little additional heat to completely prevent the formation of ice and snow and this is effectually supplied by the device of the present invention, with the result that vision is always maintained clear and unobstructed. By connecting the device into the electric circuit at the ammeter, I am able to use current either from the battery or from the generator of the automobile and the ammeter will indicate the amount of current being used.

It is to be understood that the invention is not limited to the precise construction set forth but that it includes within its purview whatever changes fairly come within either the terms or the spirit of the appended claims.

Having described my invention what I claim is:

1. A device of the character described, comprising an oscillatory arm, an elongated casing supported therefrom of tubular formation at its upper and lower ends and of U-shape in cross section between said upper and lower ends, the sides of the U-shaped portion comprising return bends constituting channels, rubber strips gripped in said channels, an insulating plug seated in the upper-end tubular portion of the casing, a conducting rod extending through the insulating plug, carrying means for attaching a conducting wire thereto, and a heating wire connected to the lower end of said rod and extending the full length of the U-shaped portion of the casing and grounded at the lower tubular portion of the casing.

2. A device of the character described, comprising an oscillatory arm, an elongated casing supported therefrom of tubular formation at its upper and lower ends and of U-shape in cross section between said upper and lower ends, the sides of the U-shaped portion comprising return bends constituting channels, rubber strips gripped in said channels, an insulating plug seated in the upper-end tubular portion of the casing, a conducting rod extending through the insulating plug, carrying means for attaching a conducting wire thereto, a spiral heating wire connected to the lower end of said rod and extending the full length of the U-shaped portion of the casing and grounded at the lower tubular portion of the casing, a lining of heat insulating material within the casing extending about the sides and across the rear side thereof, but open at the side thereof toward the glass to be wiped, so that said glass will be exposed to the direct action of the heat from said wire.

In testimony whereof he affixes his signature.

LEVI T. NIXON.